(12) United States Patent
Dause et al.

(10) Patent No.: US 9,015,672 B2
(45) Date of Patent: Apr. 21, 2015

(54) INTERFACE SIMULATOR FOR TEST RIG IN DATA DISTRIBUTION SERVICE

(75) Inventors: Stephen H. Dause, King George, VA (US); Nathan J. Schmidt, Fredericksburg, VA (US); Thomas G. Turner, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 537 days.

(21) Appl. No.: 13/385,463

(22) Filed: Jan. 31, 2012

(65) Prior Publication Data
US 2015/0012911 A1 Jan. 8, 2015

(51) Int. Cl.
*G06F 9/44* (2006.01)
*G06F 11/36* (2006.01)

(52) U.S. Cl.
CPC .................. *G06F 11/3664* (2013.01)

(58) Field of Classification Search
None
See application file for complete search history.

(56) References Cited

U.S. PATENT DOCUMENTS

| | | | | |
|---|---|---|---|---|
| 6,947,965 B2 * | 9/2005 | Glass | | 709/203 |
| 7,203,929 B1 * | 4/2007 | Vinodkrishnan et al. | | 717/124 |
| 7,496,895 B1 * | 2/2009 | Mosterman et al. | | 717/124 |
| 7,610,578 B1 * | 10/2009 | Taillefer et al. | | 717/124 |
| 7,665,096 B2 * | 2/2010 | Weida | | 719/316 |
| 7,735,017 B2 | 6/2010 | Cunningham et al. | | 715/770 |
| 7,792,117 B1 | 9/2010 | Keller et al. | | 370/392 |
| 7,950,004 B2 * | 5/2011 | Vieira et al. | | 717/125 |
| 8,375,094 B2 * | 2/2013 | Hawkins et al. | | 709/206 |
| 8,671,394 B1 * | 3/2014 | Taillefer | | 717/125 |
| 8,695,015 B2 * | 4/2014 | Borgendale et al. | | 719/313 |
| 8,752,030 B1 * | 6/2014 | Chen et al. | | 717/135 |
| 8,799,247 B2 | 8/2014 | Prabhakar et al. | | 707/703 |
| 2003/0177170 A1 * | 9/2003 | Glass | | 709/203 |
| 2006/0090155 A1 * | 4/2006 | Gurevich | | 717/136 |
| 2008/0115116 A1 * | 5/2008 | Francis et al. | | 717/135 |
| 2008/0155513 A1 * | 6/2008 | Ling et al. | | 717/135 |
| 2009/0138891 A1 * | 5/2009 | Winig et al. | | 719/313 |
| 2011/0258603 A1 * | 10/2011 | Wisnovsky et al. | | 717/125 |

OTHER PUBLICATIONS

Pietzuch et al.Towards a Common API for Publish/Subscribe. Proceedings of the 2007 inaugural international conference on Distributed event-based systems, 2007, pp. 152-157. Retrieved on [Jan. 7, 2015] Retrieved from the Internet: URL<http://dl.acm.org/citation.cfm?id=1266924>.*

Wang et al. A DDS Based Framework for Remote Integration over the Internet. 7th Annual Conference on Systems Engineering Research, Apr. 2009, Retrieved on [Jan. 7, 2015] Retrieved from the Internet: URL<www.researchgate.net>.*

* cited by examiner

*Primary Examiner* — Thuy Dao
*Assistant Examiner* — Cheneca Smith
(74) *Attorney, Agent, or Firm* — Gerhard W. Thielman, Esq.

(57) ABSTRACT

A method of interface simulation is provided for enabling publication and subscription of messages for a given problem domain, without requiring development of software or code. The method includes identifying a set of messages using the DDS as a problem domain; generating said .java message class from said problem domain generated from a .idl file for Interface Definition Language (IDL); processing said .java message class by Java reflection; generating a plurality of .java message stubs generated in the IDL format of said problem domain; incorporating said plurality of .java message stubs into a .jar message class file by said Java reflection; and rendering a graphical display that enables an operator to select and edit a .java message object from said plurality of stubs in said .jar message class.

8 Claims, 2 Drawing Sheets

INTERFACE SIMULATOR FOR TEST RIG IN DATA DISTRIBUTION SERVICE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to the field of system and network testing, and more specifically to a means of testing systems that employ Real-Time Innovations Data Distribution Service (RTI DDS).

The Data Distribution Service (DDS) paradigm is an Object Management Group (OMG) standard addressing publish-subscribe communications for real-time and embedded systems. Using DDS, applications of distributed systems share information by reading and writing data-objects. The Real-Time Innovations Data Distribution Service (RTI DDS) suite is one implementation of a data distribution service.

Currently, when testing a software application A that communicates using DDS, an operator must first write a custom DDS-enabled program B to send messages that A receives in kind. Conversely, B must also receive messages that A sends in order to fully test A. This is a tedious process for simple testing purposes.

Consequently, there exists a desire to provide a user-friendly graphical interface for viewing, modifying and sending/receiving DDS messages in any given domain. The scope and content of messages in one problem domain will differ greatly from another. The desirable aspect of this user-friendly interface would be the ability to view, modify, and send/receive messages in any given problem domain, without having to write a specific program (i.e., the aforementioned software application B) to do so.

The reflection capability of the Java programming language has been used for a variety of purposes in computer science. Its power lies in the ability to manipulate data in computer memory, the exact format of which is unknown until runtime (the time at which an application is run). As such, it is aptly suitable to providing the graphical interface described above. So far as is known, using Java reflection (or any other similar capability) to accomplish this particular task of sending and receiving messages in any given problem domain has not been done before.

SUMMARY

Conventional message propagation yield disadvantages addressed by various exemplary embodiments of the present invention. In particular, various exemplary embodiments provide an RTI DDS interface simulator that enables an operator to publish and subscribe messages for any given domain, without having to develop any software or write any code to do so.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
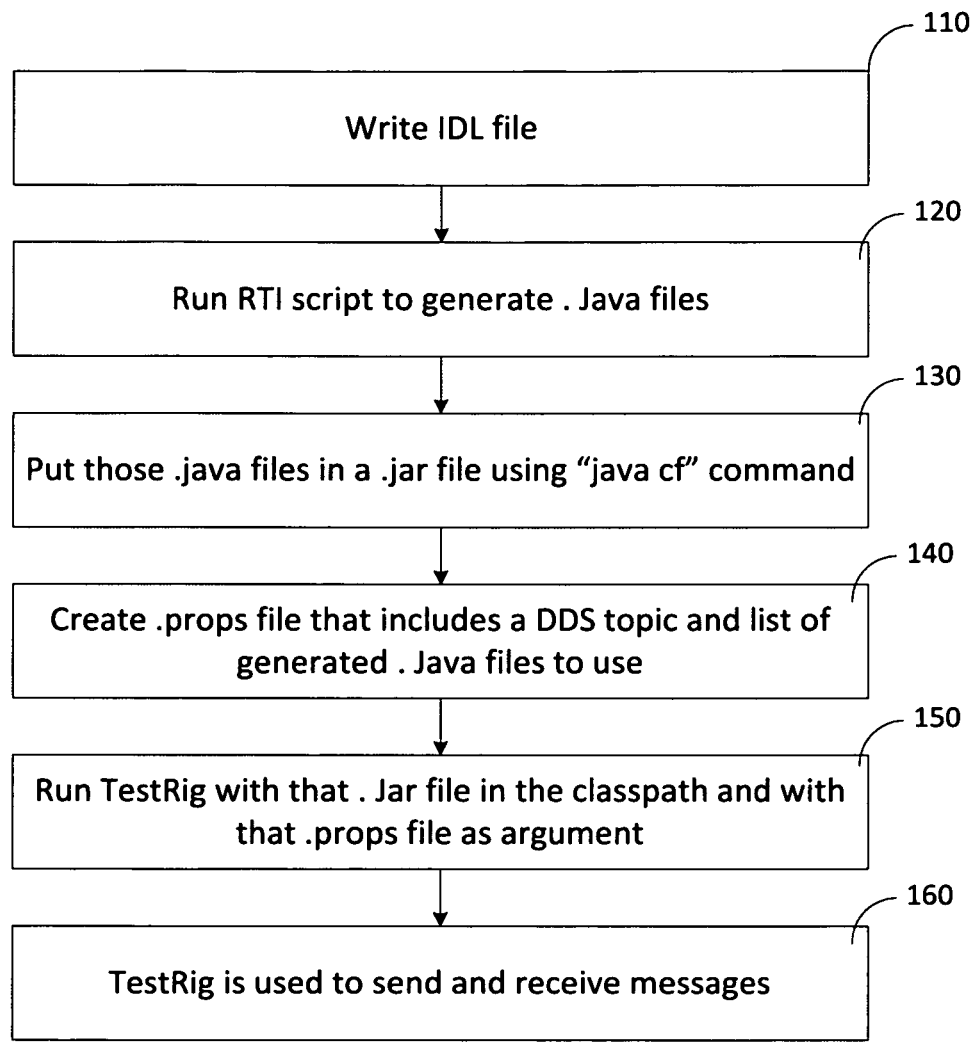
FIG. 1 is a flowchart illustrating an exemplary method for creating files to be sent using Test Rig.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

As used herein, the term "DDS" or "data distribution service" refers to a protocol that describes a system interface used to deliver messages via the publication-subscription paradigm. Software that implements DDS utilizes standard socket transmission control protocol/internet protocol (TCP/IP) formats and/or shared memory to create an abstraction layer used for the sending and receiving of messages.

As used herein, the term Interface Definition Language File "IDL file" refers to an exemplary . idl file that defines data and functions of a particular software interface, e.g., DDS. As used herein, the term "object" references a set of data in computer memory that contains useful information. As used herein, the term "class information" describes the structure of the data for an object as well as the functions (or subroutines) that are available for that object. As used herein, the term "Java message class" describes the set of class information in a Java file.

As used herein, the term "Java reflection" describes the capability of the Java programming language to dynamically determine and use the class information of an object in memory at runtime. This capacity enables a programmer to write an application that can discover and use information about objects currently in memory, even if the programmer has no familiarity with those objects when writing the program. As used herein, the term "problem domain" is meant as the set of messages defined by a system that uses DDS.

As used herein, the term "enumerated value" means a variable that can be set to one of a possible finite list of predetermined values. As used herein, the term "Java classpath" refers to the list of classes that a Java application has available at runtime. Moreover, the terms "substantially" or "approximately" as used herein may be applied to modify any quantitative representation that could permissibly vary without resulting in a change in the basic function to which it is related. The process can be implemented in automated fashion by electronic hardware or computational software, depending on the relevant application and the platform to be employed.

FIG. 1 shows an exemplary flowchart illustrating how an operator creates messages to be published and/or subscribed using a DDS interface simulator. In the exemplary embodiment illustrated, DDS interface simulator is configured to run a Java program launched and run by a Java Virtual Machine.

In Steps 110-140, an operator provides DDS interface simulator with a list of messages the operator intends to publish, as well as the Java source code libraries, e.g., .jar files used to publish and subscribe those messages. The messages can be written as .idl files. The operator then executes an RTI DDS script to generate .java message classes from their IDL format in Step 120.

Specifically, the .java message classes contain the names of all the variables for a given object. These variables can be integer values, floating point values, strings of American Standard Code for Information Interchange (ASCII) text, enumerated values, arbitrary lists of variables, or lists of lists.

Step 130 involves placing the .java message class files into a .jar file using the "java cf" command. The operator then writes a list in a .props file that simply contains one line of text for every message class that the operator intends to send using the Test Rig in Step 140. The operator then executes Test Rig with the .jar file in the Java classpath and the .props file as a command-line argument in Step 150.

In Step 160, Test Rig uses the information given in Step 150 to create publishers and subscribers for each. The DDS interface simulator is then used to send and receive messages. One or more messages can be sent, as per operator input. These messages can be of the same Java message class or of different message classes. The content, order and timing of these messages can all be varied, per operator input. Using Java reflection, Test Rig processes the Java message classes to automatically provide the operator with an interface to send/receive DDS messages. The output includes a GUI and the customized messages that Test Rig sends and receives.

Figure 2:
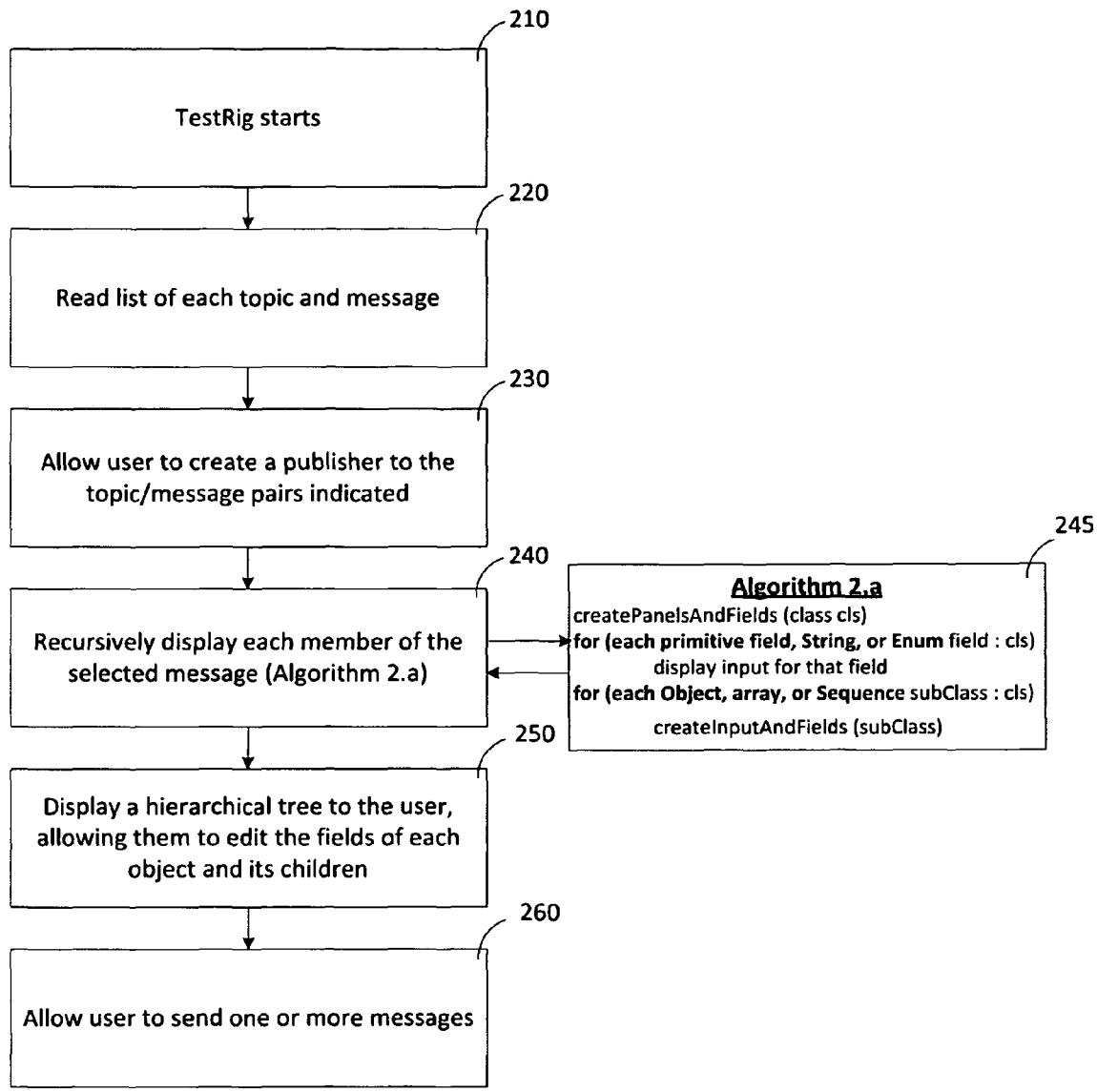
FIG. 2 is a flowchart illustrating an exemplary method for generating a graphical user interface (GUI) for a DDS interface simulator.

FIG. 2 shows an exemplary flowchart illustrating a computer-implemented method used by a DDS interface simulator to publish and/or subscribe one or more messages. After the DDS interface simulator has received the necessary file inputs, as illustrated in FIG. 1, the Test Rig starts in Step 210.

In Step 220, the operator is then provided with a GUI to access the publishers and subscribers created in Step 160 of FIG. 1. The operator then graphically selects the messages to publish and to which to subscribe for a particular specified scenario.

The operator also selects how many messages to publish, at what rate to publish them, and the content (static or dynamically modified) of each of the fields in those messages. The dynamic modification of the messages can be random, incremental, or further customized using Java scripts.

In Step 230, the GUI is updated to recursively display each member of the selected messages using an algorithm illustrated as Step 235. In Step 240, the GUI is updated to display a hierarchical tree to the operator, enabling the operator to edit the fields of each object and its children. The operator then chooses to send one or more messages in Step 250.

In the exemplary embodiments described, DDS interface simulator is adapted to work with any messages from an IDL file and may, as a result, be used as a testing tool on any network or system using RTI DDS. In further exemplary embodiments, the DDS interface simulator may be adapted to work with a more specific file-type used on a specific network. As illustrated in FIGS. 1 and 2, the use of Java reflection provides the automation which removes the operator's need to write custom DDS-enabled programs to send and receive messages in a problem domain.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method for testing a Data Distribution Service (DDS) interface for communicating with a DDS, said method comprising:
   identifying a set of messages using the DOS as a problem domain each message written as a .idl file in an Interface Definition Language (IDL) format;
   generating a .java message class from said problem domain;
   processing said .java message class by Java reflection to determine class information;
   generating a plurality of .java message stubs in said IDL format of said problem domain based on said class information;
   incorporating said plurality of .java message stubs into a .jar message class file by said Java reflection; and
   rendering a graphical display that enables an operator to select and edit a .java message object from said plurality of stubs in said .jar message class as a selected stub message.

2. The method according to claim 1, further including:
   recursively displaying said selected stub message.

3. The method according to claim 1, wherein Java reflection is provided by a Real-Time Innovations (RTI) DDS tool.

4. The method according to claim 3, further including:
   creating a plurality of RTI DOS publishers and subscribers using Java reflection to call a function; and
   sending said selected stub message.

5. The method of claim 1, further including:
   displaying a hierarchical tree of said plurality of stub messages;
   enabling said operator to edit a field of said plurality of stub messages for setting integer values, decimal values, ASCII text values, enumerated values, a variable-length list of objects, and a text content; and
   sending said plurality of stub messages.

6. The method of claim 1, further including:
   creating a plurality of .props files.

7. The method of claim 6, wherein said .props files further include a list of generated .java files.

8. The method of claim 1, wherein incorporating said .java message stubs in a .jar file includes using a java cf command.

* * * * *